(12) United States Patent
Westerinen et al.

(10) Patent No.: US 6,867,985 B2
(45) Date of Patent: Mar. 15, 2005

(54) COMPUTER SYSTEM WITH NOISELESS COOLING

(75) Inventors: William J. Westerinen, Sammamish, WA (US); Simon Yingchun Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/364,247

(22) Filed: Feb. 11, 2003

(65) Prior Publication Data

US 2004/0156180 A1 Aug. 12, 2004

(51) Int. Cl.[7] .............................................. H05K 9/00
(52) U.S. Cl. ...................................... 361/818; 361/709
(58) Field of Search .............................. 361/816, 818, 361/800–801, 804, 807, 709; 174/35 R, 51

(56) References Cited

U.S. PATENT DOCUMENTS

| | | | |
|---|---|---|---|
| 5,612,852 A | * | 3/1997 | Leverault et al. ........... 361/687 |
| 5,671,120 A | | 9/1997 | Kikinisi |
| 5,731,952 A | | 3/1998 | Ohgami et al. |
| 5,898,572 A | | 4/1999 | Shennib et al. |
| 6,137,694 A | | 10/2000 | Kerrigan et al. |
| 6,288,866 B1 | * | 9/2001 | Butler et al. ............. 360/97.01 |
| 6,459,577 B1 | | 10/2002 | Holmes et al. |
| 6,473,305 B1 | * | 10/2002 | Gordon et al. .............. 361/704 |
| 6,501,644 B1 | * | 12/2002 | Silverman et al. .......... 361/685 |
| 6,549,414 B1 | | 4/2003 | Tohukara et al. |
| 6,557,675 B2 | * | 5/2003 | Iannuzzelli ................. 188/380 |
| 6,567,360 B1 | * | 5/2003 | Kagawa ..................... 369/75.1 |
| 6,574,101 B2 | * | 6/2003 | Tanaka et al. .............. 361/687 |

FOREIGN PATENT DOCUMENTS

WO WO 01-35199 A1 5/2001

OTHER PUBLICATIONS

Sony Corp., Patent Abstracts of Japan, 2000082887 (JP 10–252286, filed Sep. 9, 1998) (Mar. 21, 2000).

Cybernetics Technology Co., Patent Abstracts of Japan, 2001159931 (JP 2000–079710, filed Mar. 22, 2000) (Jun. 12, 2001).

* cited by examiner

*Primary Examiner*—Kamand Cuneo
*Assistant Examiner*—Thanh S. Phan
(74) *Attorney, Agent, or Firm*—Leydig, Voit & Mayer, Ltd.

(57) ABSTRACT

A computer system uses a large heat sink to provide noiseless cooling, thereby avoiding the need for a conventional cooling fan that can be very noisy. The heat sink forms a part of a chassis that contains the motherboard and hard drive of the computer. The motherboard and hard drive are mounted in the chassis to provide thermal conduction from the microprocessor on the motherboard and from the hard drive to the heat sink, which dissipates the heat in the ambient air. Enhanced EMI shielding is provided by placing a shroud with vented top and bottom over the chassis containing the motherboard and the hard drive.

23 Claims, 5 Drawing Sheets

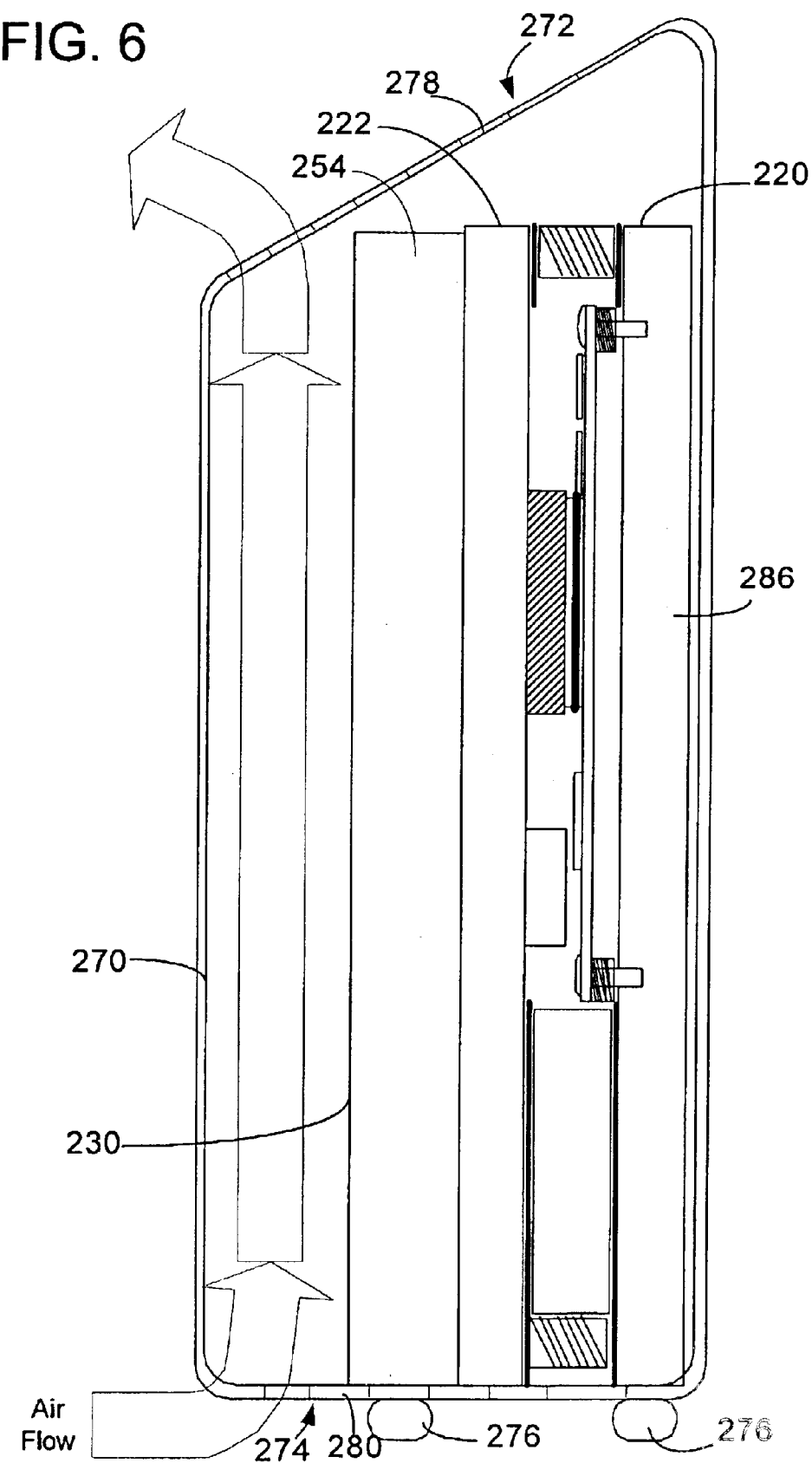

COMPUTER SYSTEM WITH NOISELESS COOLING

FIELD OF THE INVENTION

The present invention relates generally to computer hardware and, in particular, to mechanisms for cooling components of a personal computer.

BACKGROUND OF THE INVENTION

Conventional personal computers are very noisy devices. The main source of the noise generated by a conventional personal computer is the cooling fan in the computer housing. The fan is needed to provide air-cooling to the components enclosed in the computer housing. Cooling is especially important for the microprocessor integrated circuit (IC) of the computer. As the microprocessors in modem computers become more and more powerful, the device density of the microprocessor IC's has become very high. Without proper cooling, the heat generated by the large number of devices in the microprocessor IC can quickly cause the IC to overheat and damage the IC. Another component that generates a significant amount of heat (as well as noise) is the hard drive, which is constantly spinning when the computer is in the operational state to allow quick disk input/output. To remove all the heat generated by the components in the computer housing, which can be up to several hundred watts, the fan has to be fairly powerful, i.e., rotating at a high speed to generate an air stream that flows through the computer housing at a high rate. The noise of the airflow and the mechanical vibration of the fan form a main part of the loud noise of a conventional personal computer.

The loud noise of conventional fan-cooled computers is highly undesirable. The noise emitted by a personal computer in either a home or office is distracting and annoying, and can have negative effects on the productivity of the users. Even if the users can try to mentally tune out the noise, it may still affect them physically and mentally. Also, consumers are often reluctant to place a personal computer in areas of the home where the loud noise can interfere with activities such as listening to music or sleeping. The loud noise may also directly affect the usefulness of fan-cooled computers in many applications. For instance, noise emission from a computer affects the signal-to-noise ratio (SNR) of an embedded microphone in the computer, making voice input less reliable. Also, despite the powerful capabilities of modem personal computers for processing music data, a fan-cooled computer is typically too loud to be used directly in a recording studio, and would require the to run the microphone to another room to avoid the noise.

Thus, the reduction or elimination of the loud noise generated by the cooling fan in a computer can potentially improve the productivity of computer users in both the office and home settings, and make the computer usable in applications where noise is a concern. Moreover, the willingness of consumers to place a personal computer anywhere in the home or work place is essential to the success of personal computers of future generations. The removal of the loud noise of today's fan-cooled computers can be a significant factor in achieving that goal.

Besides the noise, using a fan to provide cooling has other drawbacks. The fan itself is operated by electrical power from the computer power supply and thus increases the power consumption of the computer and adds heat to the total amount of heat it is to remove from the computer. Another significant problem with fan cooling is that the fan becomes a single point of failure of the computer. If the fan is broken, the entire computer becomes unusable.

SUMMARY OF THE INVENTION

In view of the foregoing, the present invention provides a new approach to the construction of a personal computer that provides noiseless cooling for components of the computer, especially the microprocessor and the hard drive. The cooling mechanism in accordance with the invention eliminates not only the noisy fan but also the traditional computer case used to enclose the internal components. Instead, a large heat sink is used as a part of the chassis that contains the motherboard and the hard drive. The heat sink is exposed to the external ambient air for heat dissipation. The motherboard and the hard drive are supported in the chassis such that both the microprocessor and the hard drive are held tightly against the heat sink to allow the heat generated by the microprocessor and the hard drive to be conducted to and dissipated by the heat sink. If necessary, a low-power blower, which is much quieter than the fan used in a traditional computer, can be used to assist the airflow through the chassis of the computer. The longevity, or reliability, of low-power blower is considerably better than a conventional computer fan. By using the passive cooling provided by the heat sink, the traditional noisy high-power cooling fan is eliminated, resulting in a noiseless computer.

BRIEF DESCRIPTION OF THE DRAWINGS

FIG. 6 is a side view of another alternative embodiment in which a heat sink on which the motherboard and hard drive are mounted is enclosed in a shroud (or chimney) for RF shielding.

DETAILED DESCRIPTION OF THE INVENTION

Figure 1:
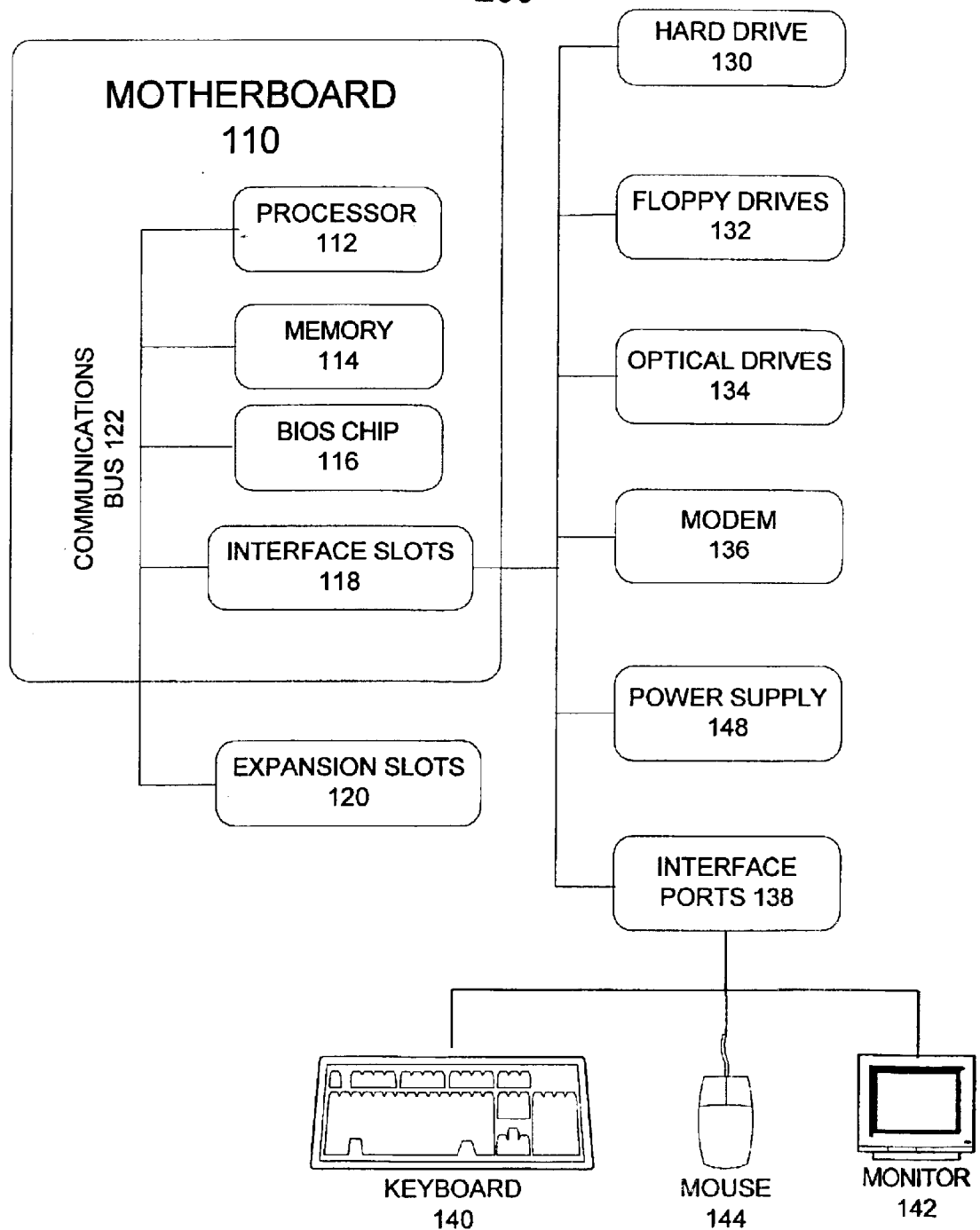
FIG. 1 is a functional block diagram illustrating common components included in a computer system implementing the invention.

Referring now to the drawings, wherein like reference numerals refer to like elements, FIG. 1 shows some components that are common to the makeup of a personal computer implementing the invention. In a traditional-style personal computer design, these components may be enclosed in a computer housing where they are cooled by a noisy high-power fan. In contrast, as described in greater detail below, there is no high-power fan used in the computer 200. Instead, a large heat sink is used for providing noiseless cooling, and at least the motherboard and the hard drive are mounted in a chassis 220 (see FIG. 2) of which the heat sink is a part.

As shown in FIG. 1, the computer 200 includes a motherboard 110 on which the microprocessor integrated circuit (IC) 112 is mounted. Also typically mounted to the motherboard are one or more memory chips 114 for the temporary or permanent storage of data and a BIOS chip 116 that assists the computer during start-up. To provide communication links between the components mounted to the motherboard 110, various communication buses 122 such as the system bus and the PCI bus are provided on the motherboard.

The motherboard 116 may also include interface slots 118 for connection to components not located on the motherboard. The computer may further include expansion slots 120 for later addition of new functionality devices. In a conventional computer construction, the extension slots are typically located on the motherboard. In a preferred embodiment of the present invention, however, the extension slots are located in a base 202 (see FIG. 2) of the computer, because the motherboard 110 is in close proximity with the heat sink and it is easier to provide the space and accessibility for the slots and the extension boards inserted into the slots.

Also illustrated in FIG. 1 are many other components that are not mounted directly on the motherboard 110. As described in greater detail below, the hard drive 130, which provides a form of non-volatile data storage, is also mounted on the chassis 220 formed partially by the heat sink. Other components include floppy drives 132, optical drives 134, and modems 136. In a preferred embodiment described below, these components are located in a base 202 of the computer. The computer system may further include peripheral devices such as a keyboard 140, a monitor 142, and a mouse 144.

Figure 2:
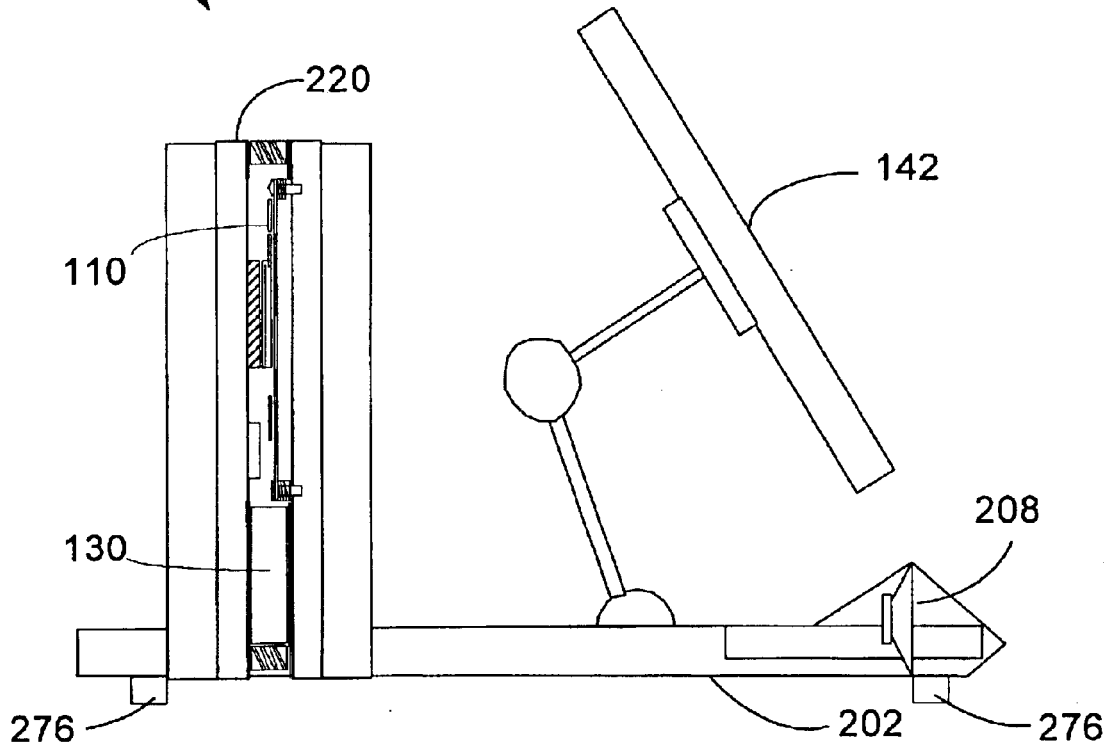
FIG. 2 is a partially schematic side view of an embodiment of a personal computer constructed in accordance with the present invention that uses a large heat sink to provide noiseless cooling.

Referring now to FIG. 2, the present invention is directed to a new computer construction that provides noiseless or low-noise cooling for components of the computer 200. In accordance with the invention, the cooling is not provided by using a conventional high-power fan that can be extremely noisy. Instead, the present invention utilizes an unconventional construction that includes a large heat sink 222 to provide passive air-cooling. As shown in FIG. 2, the heat sink 222 forms a part of a chassis 220 that contains at least the motherboard 110 and the hard drive 130. In sharp contrast to small heat sinks sometimes mounted on individual components in the housing of a conventional computer, the heat sink 222 is not enclosed in a closed box. Rather, the heat sink 222 is sufficiently large to cover both the motherboard 110 and the hard drive 130, and is part of the computer chassis 220 that is exposed to the ambient air of the external environment. The motherboard 110 and the hard drive 130 are mounted in the chassis 220 such that the microprocessor chip 112 and the hard drive are both tightly held against the heat sink 222 to allow heat generated by the microprocessor and the drive to be conducted to the heat sink, which then dissipates the heat into the ambient air. The chassis 220 is raised from the supporting surface on which the computer sits by short legs (or stand-offs) 276 mounted on the base 202 to allow cooling air to flow into the chassis from the bottom.

Figure 5:
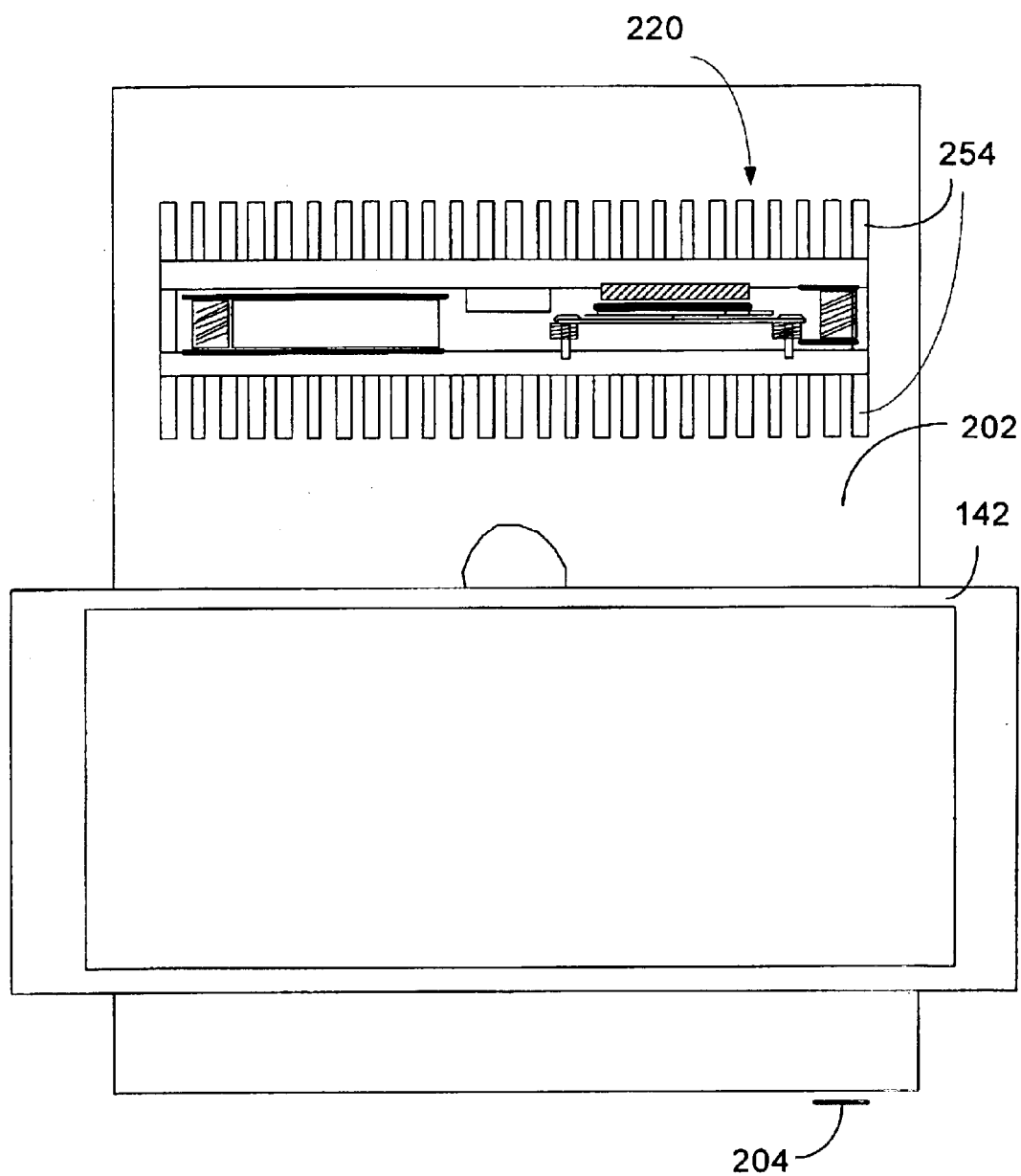
FIG. 5 is a side view of an alternative embodiment of the chassis that has a different arrangement of the motherboard and hard drive therein.

In the illustrated embodiment, the chassis 220 is formed mainly by two large heat sinks 222 and 224. The heat sinks are made of a material with a high thermal conductivity, such as aluminum. Extruded aluminum heat sinks are easily available and inexpensive. As illustrated in FIG. 5, the heat sinks have vertical fins 254 that protrude outwardly. The inclusion of the fins 254 increases the surface areas of the heat sinks to improve the heat dissipation capability of the heat sinks.

Figure 3:
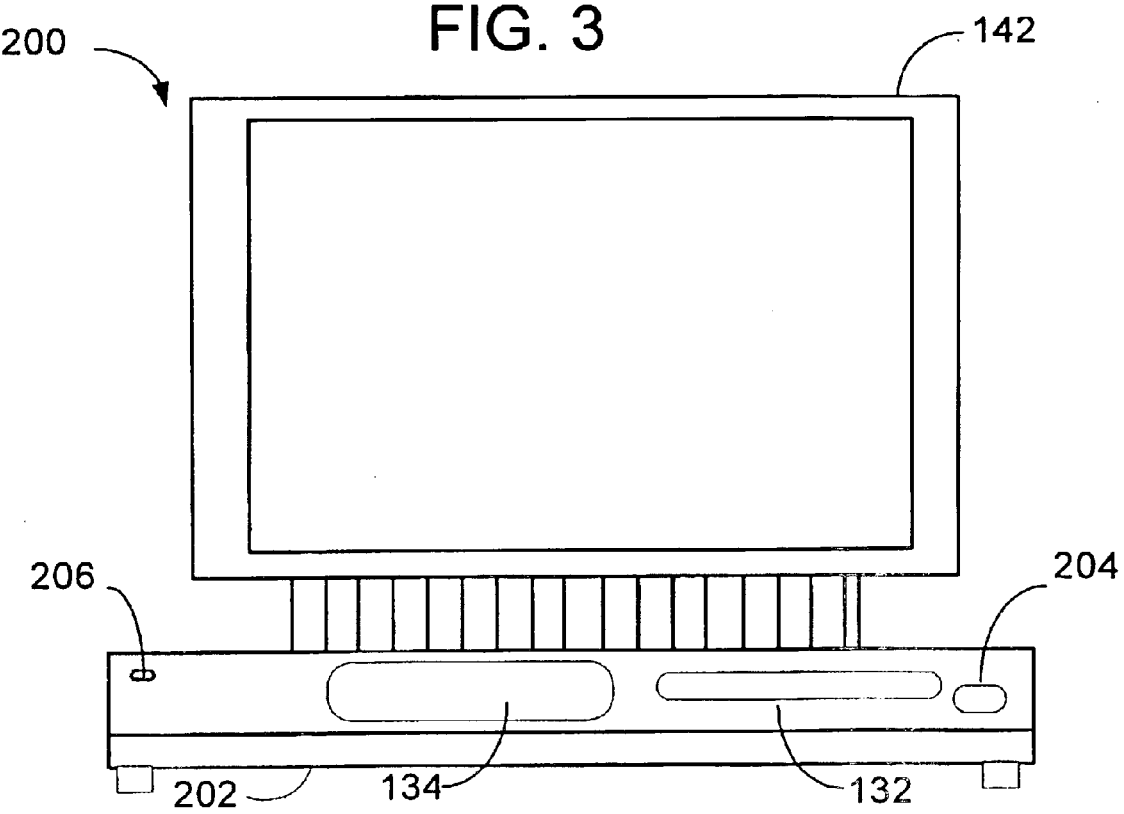
FIG. 3 is a front view of the personal computer of FIG. 2.

In the embodiment shown in FIG. 2, the chassis 220 containing the motherboard and the hard drive is mounted on and connected to a base 202. The base 202 also supports a monitor 142. The monitor 142 in the illustrated embodiment is a flat panel display, but other types of monitors, such as a cathode ray tube type, may be used. The base 202 has a flat top structure that supports the monitor 142 and provides a cradle for the chassis 220. Besides providing a structure for supporting the monitor and the chassis 220, the base 202 provides the space for containing computer components that do not fit in the relatively tight space inside the chassis 220. For instance, as mentioned above, the base 202 may contain extension slots and the associated extension cards. The base 202 also contains the floppy drive 132 and the optical disk drive 134, as well as the power supply and other components such as the modem. As shown in FIGS. 2 and 3, the base 202 also incorporates a power switch 204, a power indicator light 206, and an audio output speaker 208.

Figure 4:
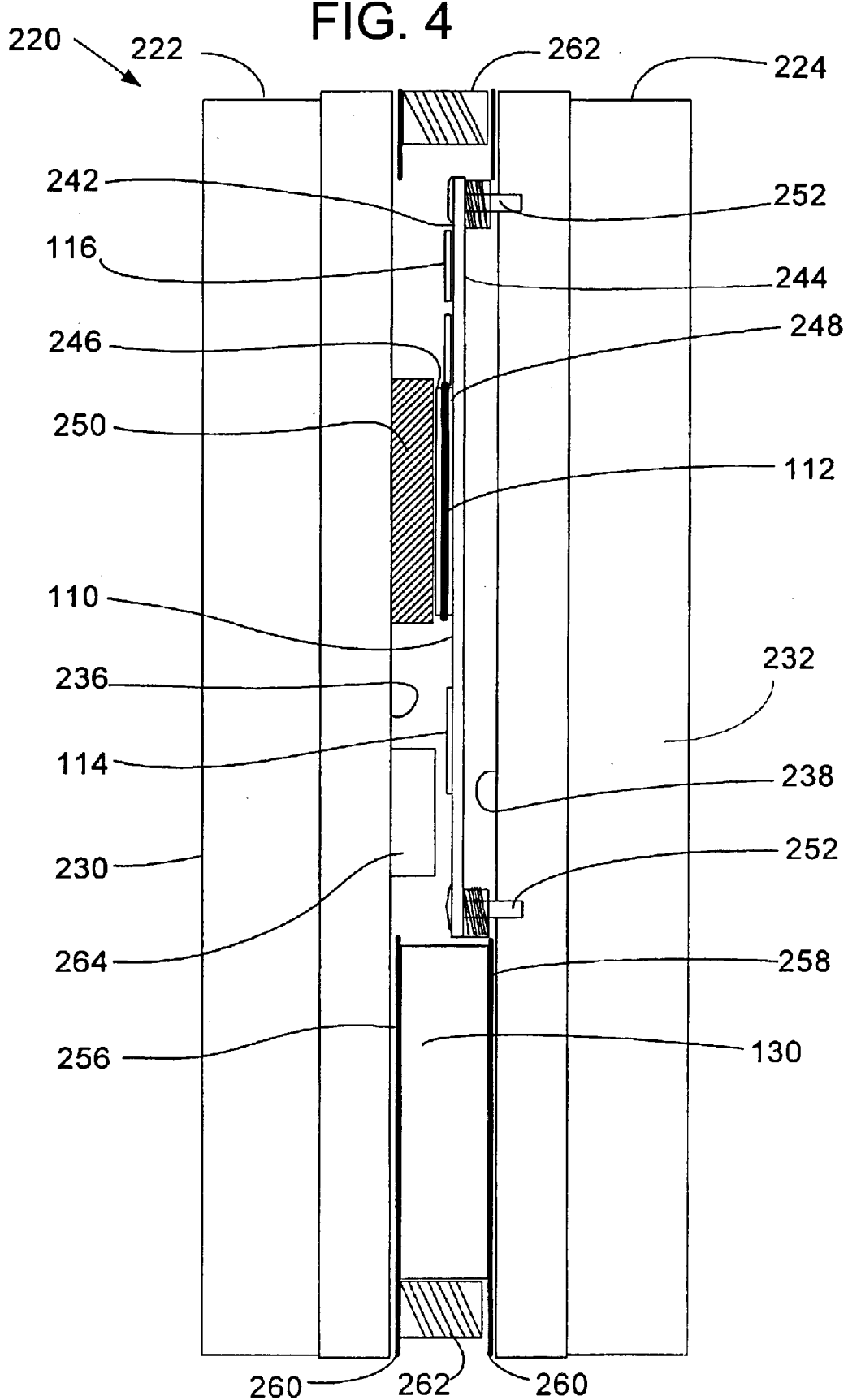
FIG. 4 is a more detailed side view of a chassis of the computer that is formed by two heat sinks and contains the motherboard and hard drive of the computer.

The structure of the chassis 220 and the components therein are better seen in FIG. 4. In the illustrated embodiment, to provide increased heat dissipation capability, two heat sinks 222 and 224 are used. The heat sink 224, however, may be replaced by a simple planar member, such as the support member 286 in the alternative embodiment of FIG. 6, if the extra heat dissipation provided by a second heat sink is not required. As shown in FIG. 4, the first heat sink 222 and the second heat sink 224 are disposed to be in an opposing position, with their respective contact surfaces 236 and 238 facing inward and generally parallel to each other and their sides 230, 232 with heat fins facing outward. The two heat sinks 222 and 224 form the chassis 202, and the motherboard and hard drive are mounted to the heat sinks inside the gap 240 between the two heat sinks. Thus, the heat sinks not only provide noiseless cooling but also provide structural support and protective for the computer components contained therein. Air flowing through the gap 240 of the chassis 220 also helps to cool the components in the chassis. For ease of mounting the components within the gap 240, the contact surfaces 236, 238 of the heat sinks are preferably formed as planar surfaces having a generally rectangular outline.

The motherboard 110 is typically a rectangular board having opposing first and second surfaces 242, 244 to which a plurality of circuits mounted thereon. In the illustrated embodiment, the microprocessor 112 is on the first surface 242 of the motherboard 110. The motherboard 110 is mounted to the contact surface 238 of the heat sink 224, with the motherboard's second surface 244 generally parallel to and offset from the second contact surface 238.

To dissipate the heat generated by the microprocessor 112, the motherboard 110 is mounted such that topside 246 of the microprocessor 112 is placed in thermal contact with the contact surface 236 of the first heat sink 222. As used herein, "thermal contact" means a contact by which heat is transferred by conduction from one structure to another. Thermal contact does not necessarily mean direct physical contact. For example, in the embodiment illustrated in FIG. 4, a heat pipe 250 is used to bridge the gap between the top surface 246 of the microprocessor 112 and the contact surface 236 of the heat sink 222. The heat pipe 250 is made from a thermally conductive material, such as metal, and can be as simple as a suitably sized aluminum block. Alternatively, the heat pipe may be formed as an integral part of the heat sink 222. To ensure good heat transfer from the microprocessor 112 to the heat sink 222, thermally conductive grease or the like may be applied at the contact between the microprocessor 112 and the heat pipe 250 and the contact between the heat pipe and the heat sink 222.

For ensuring tight thermal contact between the processor 112 and the first contact surface 236 of the heat sink 222, pressure is applied to the motherboard 110 toward the heat sink 222 such that the microprocessor 112 is pressed firmly against the heat pipe 250, which is in turn pressed firmly against the heat sink 222. To that end, in the illustrated embodiment, the motherboard 110 is mounted to the second heat sink 224 with spring-loaded mounts 252 that urge the motherboard towards the other heat sink 222, causing the topside 246 of the microprocessor 112 to be pressed firmly against the heat pipe 250.

The components in the chassis 220 can be arranged in a number of different ways to maximize the efficiency of air-cooling and/or the usage of the space in the chassis 202. For example, in the embodiment shown in FIG. 4, the motherboard 110 is mounted in the chassis 220 vertically above the hard drive 130. In an alternative embodiment shown in FIG. 5, the motherboard 110 is mounted side-by-side with the hard drive in the chassis so that heat can rise more freely from each component.

Because the motherboard 110 is located within the gap 240, the other components illustrated in FIG. 1 as typically mounted to the motherboard are also protectively covered by the first and second heat sinks 222, 224. In the embodiment illustrated in FIG. 4, these components include the memory chips 114 and the BIOS chip 116. Since the memory chips 114 and BIOS chip 116 typically do not produce as much heat as the processor 112, it is not required that these components be in thermal contact with the heat sinks 222, 224. Instead, the heat produced by the memory chips 114 and the BIOS chip 116 can be dissipated directly into the air flowing through the gap 240. In other embodiments of the cooling system, additional heat pipes may extend from the first contact surface 236 to the memory chips 114 and the BIOS chip 116 to place those components in thermal contact with the first heat sink 222.

The hard drive 130 is also mounted in the gap 240 between the two heat sinks 222 and 224. The hard drive 130 is typically a rectangular structure that has a first side 256 and a second side 258. In the illustrated embodiment of FIG. 4, the hard drive 130 is mounted such that its first side 256 is pressed against the contact surface 236 of the first heat sink 222, and its second side 258 pressed against the contact surface 238 of the second heat sink 224. Thus, the hard drive 130 is sandwiched between the first and second heat sinks 222, 224. To prevent the rotating disks enclosed in the hard drive 130 from causing the hard drive to rattle noisily against the heat sinks 222, 224, two sheets of vibration-absorbing material 260 are placed between the first and second side 256, 258 of the hard drive and the contact surfaces 236, 238. The vibration-absorbing material 260 is preferably a layer of compliant material such as, for example, vinyl, that absorbs the acoustic vibrations from the hard drive 130 and converts the vibrations to a small amount of heat. The heat generated by the hard drive is conducted to the first and second heat sinks 222, 224 via the first and second contact surfaces 236, 238.

In addition to the use of the sheets 260 of vibration-absorbing material, other features can be employed to reduce noise-making vibrations and rattling in the heat sink assembly 220. For instance, the first and second heat sinks 222, 224 may be joined together with a second set of spring-loaded mounts 262 that extend across the gap 240. The spring-loaded mounts 262 dampen vibrations generated by other components mounted to the heat sinks. Furthermore, the first set of spring load mounts 252 mounting the motherboard 110 to the second heat sink 224 also isolates vibrations to and from the motherboard.

While the large heat sinks 222, 224 are expected to provide sufficient passive cooling to the components in most cases, in some embodiments it may be desirable to incorporate a low-power blower within the gap 240. For instance, as illustrated in FIG. 4, a low-power blower 264 is mounted to the first contact surface 236. When located in the gap 240, the low-power blower 264 creates a minor draft to enhance the cooling of the components. Because the low-power blower 264 is only for assisting air flow through the gap 240 between the heat sinks 222 and 224, and most of the heat is dissipated by the heat sinks, the blower 264 does not have to be very powerful and can rotate at a relatively low speed. This allows it to be made very quiet and not noticeable by users in normal operational environments.

Because the heat sinks 222 and 224 are in close proximity to various components that generate electrical signals at high frequencies (e.g., in the multiple-MHz range), the large exposed chassis may become a conductor and antenna for electromagnetic interference ("EMI"). As illustrated in FIG. 6, to prevent EMI, the chassis 220 can be enclosed within a shroud 270 that provides EMI shielding. The shroud is shaped such that a thermal chimney is formed between the heat sink wall and the shroud. The shroud 270 is preferably manufactured from a lightweight material, such as plastic with a thin metal layer deposited onto its inner wall surface by a sputtering deposition technique. To provide effective shielding, the shroud 270 preferably has a height slightly taller than that of the chassis 220. To ensure that the fins of the heat sinks 222, 224 are adequately exposed to the ambient air, the shroud 270 has a vent 272 at the top and an opening 274 at the bottom. Feet 276 are provided at the bottom of the shroud 270 to raise the shroud to allow cooler ambient air to enter the shroud through the bottom opening 274. The air that enters the shroud flows upward and over the surfaces of the heat sinks to draw away the heat, and rises out through the top vent 272.

To enhance the effectiveness of the EMI shielding, metallic screens 278, 280 are used to cover the bottom opening 274 and the top vent 272, respectively. The screens not only reduce EMI leakage through the openings but also to prevent objects from being unintentionally inserted into the shroud 270. To discourage users from blocking the flow of air within the shroud 270 by placing books or other objects atop the vent 272, the top of the shroud 270 in FIG. 6 is sloped to avoid providing a flat surface on which the user may be tempted to lay objects, such as books or papers, that can obstruct the air flow through the shroud.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer comprising:

a motherboard having a microprocessor mounted thereon;

a hard drive; and a chassis in which the motherboard and the hard drive are mounted; the chassis including a heat sink having a planar contact surface of a size sufficient to cover both the motherboard and the hard drive, the motherboard and hard drive both being mounted adjacent and parallel to the planar contact surface and mechanically coupled to the planar contact surface, with the planar contact surface covering both the motherboard and the hard drive, such that the microprocessor and the hard drive are in thermal contact with said planar contact surface of the heat sink to allow heat generated by the microprocessor and the hard drive to be conducted to the heat sink and dissipated by the heat sink.

2. A computer as in claim 1, wherein the chassis includes a support member opposite and spaced from the heat sink, and wherein the motherboard is mounted to the support member.

3. A computer as in claim 2, wherein the support member is a second heat sink having a contact surface, and the motherboard is mounted to the contact surface of the second heat sink.

4. A computer as in claim 2, wherein the motherboard is mounted to the support member by spring-loaded mounts.

5. A computer as in claim 2, wherein the hard drive is compressed between the planar contact surface of the heat sink and the support member.

6. A computer as in claim 2, wherein the heat sink and the support member are connected by spring-loaded mounts.

7. A computer as in claim 6, further including compliant sheets inserted between the hard drive and the heat sink and between the hard drive and the support member for vibration damping.

8. A computer as in claim 1, further including a base, wherein the chassis is mounted on the base.

9. A computer as in claim 8, further including a monitor, wherein the monitor is supported on the base.

10. A computer as in claim 8, wherein the base contains an optical disk drive.

11. A computer as in claim 1, further including a blower mounted inside the chassis for moving air through the chassis.

12. A computer as in claim 1, further including a shroud disposed around the chassis for electro-magnetic interference shielding.

13. A computer as in claim 12, wherein the shroud has top and bottom openings for air circulation.

14. A computer as in claim 1, including a heat-conducting member disposed between the microprocessor and the planar contact surface of the heat sink to conduct heat from the microprocessor to the heat sink.

15. A computer comprising:
a motherboard having a microprocessor mounted thereon;
a hard drive;
a chassis in which the motherboard and the hard drive are mounted; the chassis including a heat sink having a first planar contact surface of a size sufficient to cover both the motherboard and the hard drive and a support member disposed opposite and spaced from the first planar contact surface of the heat sink, the motherboard and hard drive being mounted to the support member and adjacent and parallel to the first planar contact surface and mechanically coupled to the first planar contact surface, with the first planar contact surface covering both the motherboard and the hard drive, such that the microprocessor and the hard drive are in thermal contact with said first planar contact surface of the heat sink to allow heat generated by the microprocessor and the hard drive to be conducted to the heat sink and dissipated by the heat sink; and
a base on which the chassis is mounted.

16. A computer as in claim 15, wherein the support member is a second heat sink having a second planar contact surface parallel to the first planar contact surface.

17. A computer as in claim 15, wherein the hard drive is compressed between the heat sink and the support member, and further including compliant sheets inserted between the heat sink and the hard drive and between the hard drive and the support member to provide vibration damping.

18. A computer as in claim 17, further including a heat-conducting member disposed between the microprocessor and the heat sink to conduct heat from the microprocessor to the heat sink.

19. A computer as in claim 15, wherein the motherboard is mounted on the support member by spring-loaded mounts.

20. A computer as in claim 18, wherein the heat sink and the support member are connected by spring-loaded mounts.

21. A computer as in claim 15, further including a shroud disposed over the chassis for electro-magnetic interference shielding.

22. A computer as in claim 15, further including a monitor supported on the base.

23. A computer as in claim 15, wherein the base contains an optical disk drive.

* * * * *

UNITED STATES PATENT AND TRADEMARK OFFICE
CERTIFICATE OF CORRECTION

PATENT NO.         : 6,867,985 B2
APPLICATION NO. : 10/364247
DATED                 : March 15, 2005
INVENTOR(S)       : Westerinen et al.

Page 1 of 1

It is certified that error appears in the above-identified patent and that said Letters Patent is hereby corrected as shown below:

In column 1, line 48, delete "modem" and insert -- modern --, therefor.

In column 6, line 20, delete "electromagnetic" and insert -- electro-magnetic --, therefor.

Signed and Sealed this

Twenty-ninth Day of September, 2009

David J. Kappos
*Director of the United States Patent and Trademark Office*